United States Patent [19]
Khosla

[11] Patent Number: 5,225,168
[45] Date of Patent: Jul. 6, 1993

[54] STATIC MIXING APPARATUS

[75] Inventor: Pankaj Khosla, Peoria, Ill.

[73] Assignee: Caterpillar Inc., Peoria, Ill.

[21] Appl. No.: 753,531

[22] Filed: Sep. 3, 1991

[51] Int. Cl.$^5$ .............................. C08F 2/00; B01F 5/06
[52] U.S. Cl. .................................. 422/135; 422/137;
366/177; 366/338; 366/339
[58] Field of Search .............. 422/135, 137, 224, 226,
422/229; 366/338, 339, 177; 222/145

[56] References Cited
U.S. PATENT DOCUMENTS

| | | | |
|---|---|---|---|
| 3,275,882 | 11/1966 | Armeniades et al. | 259/4 |
| 3,635,444 | 1/1972 | Potter | 259/4 |
| 3,664,638 | 5/1972 | Grout et al. | 259/4 |
| 3,800,985 | 4/1974 | Grout et al. | 222/146 H |
| 4,222,672 | 9/1980 | Shaw | 366/338 |
| 4,383,093 | 5/1983 | Shiraki et al. | 422/135 |
| 4,538,920 | 9/1985 | Drake | 366/339 |
| 4,590,030 | 5/1986 | Gillner et al. | 264/331.19 |
| 4,846,373 | 7/1989 | Penn et al. | 366/339 |
| 5,069,881 | 12/1991 | Clarkin | 422/135 |

OTHER PUBLICATIONS

Data Sheet 45, TAH Industries, Inc. "Stata-tube & Spiral Motionless Mixer; 160 Series, Spiral Mixer", Apr., 1989.
Data Sheet 45, TAH Industries, Inc. "Stata-tube & Spiral Motionless Mixer; 160 Series", Apr., 1989.
Bulletin DPP-2, ConProTec, Inc. "Statomix Low Cost Disposable Machine Mixers", Nov., 1989.

Primary Examiner—Robert J. Warden
Assistant Examiner—Christopher Y. Kim
Attorney, Agent, or Firm—David M. Masterson

[57] ABSTRACT

An apparatus for producing a homogeneous material from a mixture of a plurality of reactive components is disclosed. Included is an injector having first and second spaced apart end portions. The injector defines a plurality of cylindrical passages each having a predetermined length and a predetermined cross sectional area. The passages have an inlet at the first end portion and an outlet at the second end portion. Each of the reactive components is delivered at a pressure within a predetermined pressure range to the injector. The reactive components are adapted to pass through the passages, exiting the injector at respective flow velocities. A mixing tube having a first end portion, a second end portions, and a middle portion of a predetermined length is also included. The middle portion is located between the first and second end portion. The second end portion of the injector is in communication with the first end portion of the mixing tube. The middle portion defines a bore having a cross sectional area substantially equal to the sum of the cross sectional areas of the passages. A static mixing device is disposed within the bore and has a predetermined number of static mixing elements extending axially along the middle portion. The mixing tube and static mixing elements define a tortuous mixing path, wherein the reactive components are passable through the path causing the components to form a homogeneous material.

13 Claims, 2 Drawing Sheets

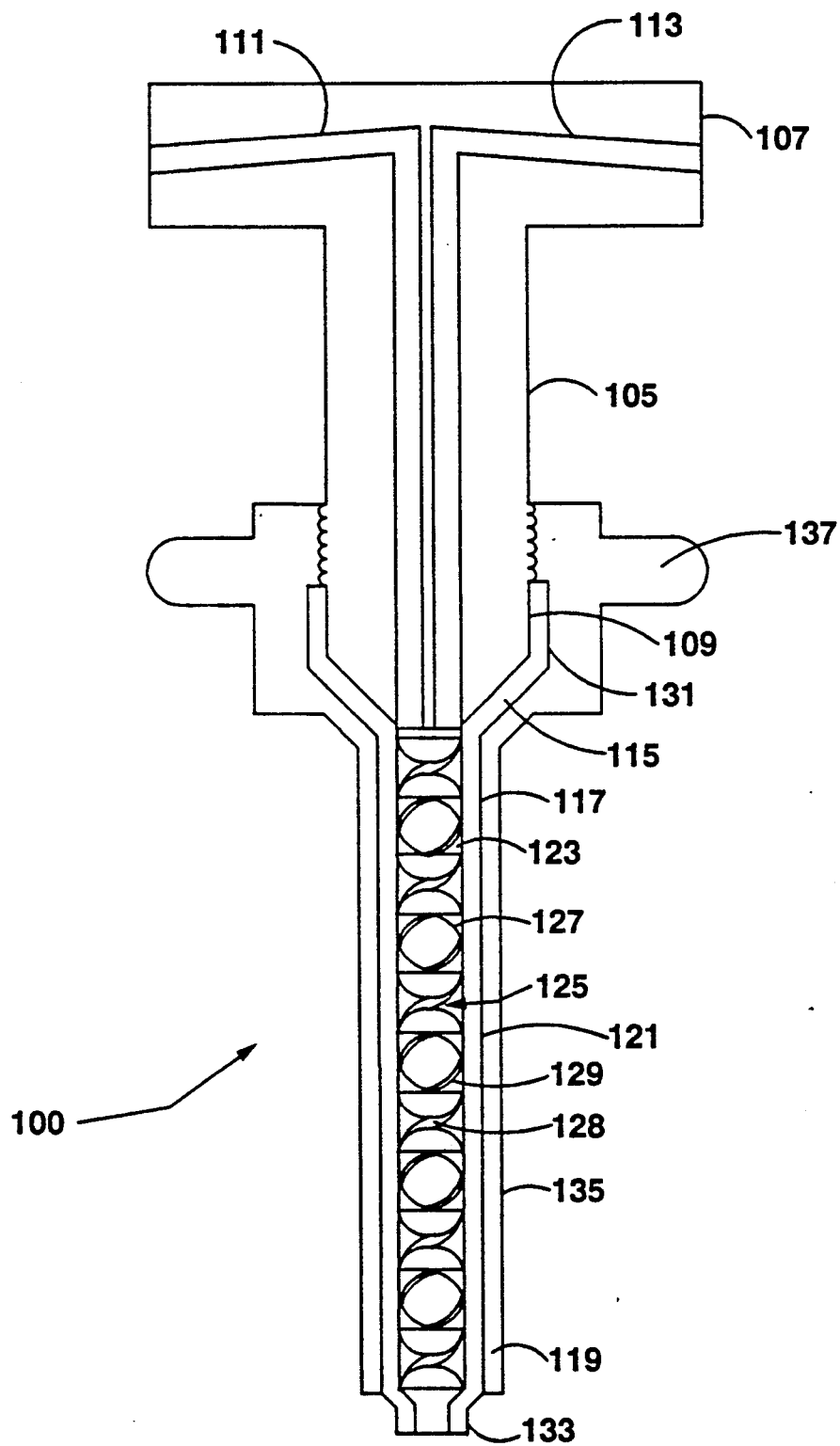

STATIC MIXING APPARATUS

DESCRIPTION

1. Technical Field

This invention relates generally to a static mixing apparatus and, more particularly, to a static mixing apparatus for mixing reactive components.

2. Background Art

In reactive flow molding processes employing a plurality of reactive components, the homogeneity and the quality of the molded material is mainly determined by the mixing operation which immediately proceeds the molding.

For example, after an amount of time in which the reactants come into contact, a polymerization reaction process begins producing the moldable material. Many times, striae form within the moldable material which are visible. The striae are a result of poor mixing which inhibits the quality of the material. Therefore, it is desirable to produce a mixture which is as homogeneous as possible, in the shortest possible time, in order to bring about a uniform reaction to avoid the formation of striae. However, there is an additional difficulty presented in mixing reactive components in the case of polyurethane, in that the two components, i.e., polyol and the isocyanate, have substantially different viscosities.

The use of known mixing processes does not lead to the desired result for producing a high quality polyurethane material For example, if one employs a static mixing process making use of various known mixers for mixing liquids in the laminar flow regime, it is found that a relatively long mixing length is needed to produce sufficient mixing. However, the mixture requires a relatively long time to pass through this long mixing length. Meanwhile, the polymerization process has already begun. Due to the quick setting characteristics of polyurethane, the material will gel or "set up" within the static mixer instead of being discharged into the usual succession of molds. The molds are generally moved on a belt assembly past the discharge of the static mixer in time relation to the discharge. If, for any reason, a slight delay or decrease in the flow rate of the mixture through the mixer occurs, the mixture gels in portions of the mixer and restricts flow, thus further slowing the discharge and resulting in the entire mixer being clogged with hard setting plastic.

Generally, such a static mixer is in the form of a tubular barrel, with a rigid static mixing device disposed therein. Because of the very nature of the static mixer, the mixer cannot be cleaned readily once any appreciable quantity of plastic has gelled in the various mixing elements which form the static mixing device. Attempts have been made to clean the static mixer, but due to the cementing and interlocking effects of the plastic this approach has proven impractical. Therefore, available static mixers perform poorly in practice because the mixer may only be used, in some instances, for 15 to 30 minutes before "plugging-up".

If in place of the static mixer one employs a dynamic mixer, with the aim of reducing the mixing time, the result is no more satisfactory. The quality of mixing is adequate but the temperature of the reaction mixture is increased by frictional heating, therefore, local fractions of the mixture are generated which are in an advanced state of polymerization. Consequently, the quality of the polyurethane is lessened due to the inconsistency of the material. Additionally, the dynamic mixer may introduce pockets of gas in the form of air bubbles into the moldable material, leading to poor quality. Moreover, dynamic mixers may require frequent flushing with solvents resulting in a sludge material which has to be disposed of.

The present invention is directed to overcoming one or more of the problems as set forth above.

DISCLOSURE OF THE INVENTION

In one aspect of the present invention, an apparatus for producing a homogeneous material from a mixture of a plurality of reactive components is disclosed. Included is an injector having first and second spaced apart end portions. The injector defines a plurality of cylindrical passages each having a predetermined length and a predetermined cross sectional area. The passages have an inlet at the first end portion and an outlet at the second end portion. A pump delivers each of the reactive components at a pressure within a predetermined pressure range to the injector. The reactive components are adapted to pass through the passages exiting the injector at respective flow velocities. A mixing tube having a first end portion, a second end portion, and a middle portion of a predetermined length is also included. The middle portion is located between the first and second end portions. The second end portion of the injector is in communication with the first end portion of the mixing tube. Advantageously, the middle portion defines a bore having a cross sectional area substantially equal to the sum of the cross sectional areas of the passages. A static mixing device is disposed within the bore and has a predetermined number of static mixing elements extending axially along the middle portion. The mixing tube and static mixing elements define a tortuous mixing path, wherein the reactive components are passable through the path causing the components to form a homogeneous material.

BRIEF DESCRIPTION OF THE DRAWINGS

For a better understanding of the present invention, reference may be made to the accompanying drawings in which:

FIG. 1 is a cross sectional view embodying the present invention; and

BEST MODE FOR CARRYING OUT THE INVENTION

Figure 2:
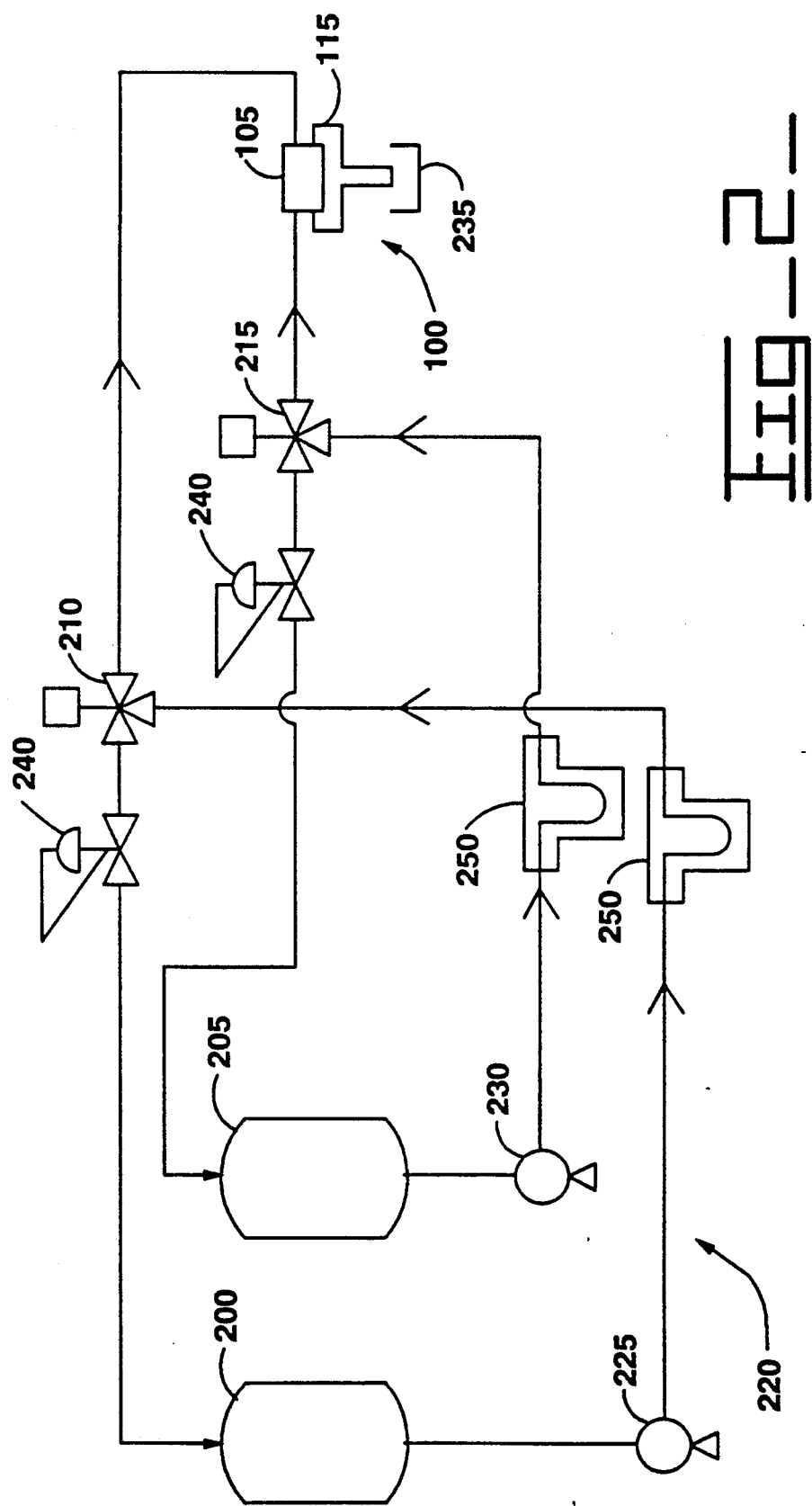
FIG. 2 is a diagram illustrating the process according to the present invention.

Referring to FIG. 1, an apparatus 100 for producing a homogenous material from a mixture of a plurality of reactive components is shown. The present invention is suitable not only for reactive type mixtures but also for the mixing of solvents and adhesives.

Advantageously, the present invention is directed to producing a flow moldable material from highly reactive components having substantially different viscosities. The flow moldable material is in the form of solid polyurethane having a density in the range of 1.15 to 1.30 grams/cc, for example.

In the preferred embodiment, the polyurethane is produced from components A and B, A comprising polyester glycol (polyol) and B comprising polymeric MDI (isocyanate). Component A is a blend of a polyester resin having a diolbased chain extender, for example, 1,4 Butenediol with a coloring agent. Additionally, two organo metallic catalysts are employed, Dibutyltin Dilaurate and a tertiary amine salt, for example. The viscosity of component A at ambient temperature is approximately 12,000 centipoise, and the viscosity of component B is 50 centipoise. Component A has a hydroxyl value 180 to 220 and a moisture content of 0.0 to 0.05 percent by weight. Component B has a content of free NCO groups of 38 percent by weight. Components A and B are mixed together in a weight ratio of 2:1.

The apparatus 100 includes an injector 105 having first and second spaced apart end portions 107,109. The injector 105 defines a plurality of cylindrical passages 111,113 having inlets and an outlets. Each passage 111,113 has a predetermined length and also a predetermined cross-sectional area. A mixing tube 115 having a first end portion 117, a second end portion 119 and a middle portion 121 is engaged with the injector 105. The middle portion 121 defines a bore 123.

A static mixing device 125 is disposed within the bore 123 extending axially along the middle portion 121. The static mixing device 125 is constructed of a predetermined number of elements 127 having right and left-hand helical twists. The elements 127 are alternated and oriented such that one element lies at 90 degrees with respect to an adjacent element. For example, one element 128 has an opposite helical twist and is shifted by a (radial) angle of 90 degrees with respect to a preceding element 129. Moreover, the mixing tube 115 and the static mixing elements 127 define a tortuous mixing path. The number of mixing elements 127 comprising the static mixing device 125 is dependent on the length of the middle portion 121. For example, the dimensions of each mixing element are uniform and is preferably 6.3 mm by 6.3 mm. The number of mixing elements is in the range of about 50 to about 60 elements. In the preferred embodiment, the number of mixing elements is 56.

The first end portion 117 of the mixing tube 115 has a bell-shaped housing 131 formed integrally with the mixing tube 115. The bell-shaped housing 131 is formed by a counter bore with a reduced tapered section. The second end portion 119 of the mixing tube 115 includes includes a nozzle 133 having a reduced tapered section. The nozzle 133 is also formed integrally with the mixing tube.

The second end portion 109 of the injector 105 is slideably engaged with the bell-housing 131. More particularly, the second end portion 109 of the injector 105 is in communication with the first end portion 117 of the mixing tube 115 and is adapted to pass fluid from the injector 105 to the mixing tube 115.

A jacket 135 having a wing assembly 137 is disposed about the mixing tube 115. The jacket is comprised of 316 stainless steel, for example, and functions to attach the injector 105 to the mixing tube 115 as well as provide a protective shield. For example, the jacket 135 is threadably fastened to the injector 105 forming a rigid connection of the injector 105 to the mixing tube 115.

Advantageously, the present invention causes components A and B to have substantially an identical velocity upon exiting the injector 105. The cross-sectional areas of each passage 111,113 are determined by using empirical formulation based on the material properties of the components. In the preferred embodiment, the diameter of the passage 111 for component A is 4.75 millimeters, for example and the diameter for the passage 113 for component B is 3.75 millimeters. Another advantage of the present invention, is that the length of the passages 111,113 provides for the respective flow velocities or profiles of the components to be fully developed or to have laminar flow characteristics. Components flowing in the laminar flow regime typically have a smoother flow profile, as compared to components flowing in the turbulent flow regime. Typically, the length of the passages should be 20 times the diameter of the passage to provide for laminar flow. In the preferred embodiment, the length of the passages 111,113 are 150 millimeters.

The length of the passages 111,113 provide for the respective flow velocities of the components to achieve a "steady-state" or constant flow velocity. For example, a component traveling through the respective passage develops a parabolic flow profile, i.e. the flow is in the shape of a parabola. This is due to the forces provided by the wall of the passage that effectively resist the flow adjacent the wall. Consequently, the flow at the center of the passage is greater than that adjacent the walls. Advantageously, the length of the passages 111,113 is sufficiently long for the flow rate of the components to achieve a constant flow velocity, i.e. the velocity at which the resistive force equals the applied force (pressure). Thus, there is zero net force and the component flows without acceleration.

Because the components obtain the same flow velocity in the laminar flow regime, the components exit the respective outlets at the same time. Therefore, the flowing stream will enter the mixing tube 115 at the same time, and consequently an exact mixing ratio is the result.

Advantageously, the middle portion 121 of the mixing tube 115 defines a bore 123 which has a cross-sectional area substantially equal to the sum of the cross-sectional areas of the passages. This allows the flow velocities of the components exiting the injector 105 to be the same as the flow velocities of the mixture flowing through the mixing tube 115. Therefore, the material flowing through the mixing tube 115 will flow at an uninterrupted flow rate achieving a high flow velocity. Further, because the cross-sectional area of the bore 123 substantially "matches" the combined cross-sectional areas of the passages 111,113 there is substantially no increase in pressure beyond the initially applied pressure. In the preferred embodiment the cross-sectional area of the bore is approximately 29 $mm^2$.

Advantageously, the apparatus 100 provides for the components to mix thoroughly producing a uniform and homogeneous mixture, before the mixture reacts substantially. Therefore, the length of the middle portion is critical. The length of the mixing tube is determined by empirical formulation and is based on the material properties of the components along with the desired pressure. Typically, the length of the middle portion 121 is approximately within the range of about 280 to about 392 millimeters. In the preferred embodiment the length of the middle portion is 354 millimeters, for example.

Moreover, the apparatus 100 is designed such that the residence time of the components or mixture within the mixing tube 115 is much less than the reaction time of the mixture The residence time is defined as the amount of time required for the components to pass through the mixing tube 115. Quantitatively, the residence time is equal to the internal volume of the mixing tube divided by the mass flow rate. In the preferred embodiment, the residence time is 0.3 seconds, for example.

Industrial Applicability

Operation of the apparatus 100 is best described in relation to producing a homogeneous material, namely rigid polyurethane. Referring to FIG. 2, a first holding tank 200 contains component A which has the material properties as described above. The temperature of the component is held at a predetermined temperature range of about 60° to about 70° C., preferably at 65° C., for example. Similarly, a second holding tank 205 contains component B at a predefined temperature range of about 25° to about 30° C., preferable 27° C., for example. Component A in the first holding tank 200 is passed to a first 2-position, 3-way valve 210. Similarly, component B is passed from the second holding tank 205 to a second 2-position, 3-way valve 215. A means 220 delivers components A and B at a pressure within a predetermined pressure range to the respective valves 210,215. The predetermined pressure range is about 300 to about 500 p.s.i. gauge, and in the preferred embodiment the pressure range is about 300 to about 350 p.s.i. gauge. The means 220 is comprised of two positive displacement pumps. More specifically, a first pump 225 is connected between the first valve 210 and the first tank 200, and a second pump 230 is connected between the second tank 205 and the second valve 215. The mass flow rate of each component is measured by flow meters 240 positioned between between the respective tanks 200,205 and valves 210,215. Additionally, the fluid pressure for each component is maintained at the predetermined pressure range by pressure regulators 250 positioned between the respective valves 210,215 and pumps 225,230.

A programmable logic controller (PLC), not shown, controls the position of the valves 210,215. The valves 210,215 may be actuated electrically, pneumatically, or mechanically, for example; or by any other method familar to those skilled in the art. Moreover, the use of a PLC is well known in the art and its operation will not be discussed.

The operation of the valves 210,215 is described below. The PLC commands the valves 210,215 to a first position allowing pressurized fluid to flow from the tanks 200,205 to the injector 105. The components flow to the injector 105 with, a mass flow rate of: component A at 20 grams/second and component B at 10 grams/second, for example. As stated earlier, the passages 111,113 cause the components to exit the injector 105 at the same instant in time, and with substantially the same flow velocity, 100 cm/s for example. This allows for an accurate mixing ratio. For example, a 2:1 mixing ratio provides for a flow rate of 30 grams/second.

The components will then enter the mixing tube 115 and travel through the tortous path mixing thoroughly, thereby forming a uniform and homogeneous mixture. Advantageously, the mixture travels through the middle portion 121 at the same velocity as the velocity of the components exiting the injector 105; and consequently, no "back-mixing" occurs. After exiting the mixing tube 115, the homogeneous mixture fills the mold 235 and reacts forming polyurethane. The mixer dispenses the homogenous material for a first period of time. preferably 2 to 3 seconds, for example. Thereafter, the PLC will then command the valves 210,215 to travel from the first position to a second position. In response to the valves being at the second position, the components will recirculate in the respective tanks 200,205. More specifically, the components travel from the tanks 200,205 to the valves 210,215 and back to the tanks 200,205. Also, a new mold will be set under the mixing tube by a belt assembly system (not shown). The valves 210,215 will remain at the second position for a second period of time, 5 seconds, for example.

During the second period of time, the flow through the mixing tube 115 is essentially negligible. Consequently, the components remaining in the static mixer 107 begin to react. At the duration of the second period of time, the PLC commands the control valves 210,215 to travel from the second position back to the first position for the first period of time. In response to the control valves being at the first position, pressurized fluid, i.e. components A and B, begin flowing through the mixing tube 115 at a high flow velocity. Therefore, the high velocity of the fluid flowing through the mixing tube 115 "pushes-out" much of the material which began to gel.

Therefore, the present invention provides for a mixing apparatus which mixes two highly reactive components having substantially different viscosities into a uniform and homogeneous material. Additionally, the dimensions of the mixing apparatus yield a low residence time and a constant velocity of flow throughout the mixing apparatus. Finally, a high axial velocity is sustained throughout the length of the mixing tube, yielding high radial velocities. Consequently, excellent mixing characteristics are achieved.

Further, the present invention provides for a mixing tube which thoroughly mixes reactive components and inhibits gelling within the mixing tube. Advantageously, the present invention has been used in the aforementioned process for a period of 6 hours without any appreciable amount of reaction within the mixing tube.

Other aspects, objects and advantages of the present invention can be obtained from a study of the drawings, the disclosure and the appended claims.

I claim:

1. A static mixing apparatus, comprising:
    an injector having first and second spaced apart end portions, said injector defining a plurality of cylindrical passages each having a predetermined length, L, a predetermined diameter, D, and a predetermined cross sectional area, the predetermined length, L, being substantially equal to (20* D), and wherein said passages have an inlet at said first end portion and an outlet at said second end portion;
    a mixing tube having a first end portion, a second end portion, and a middle portion of a predetermined length located between said first and second end portion of said mixing tube, said second end portion of said injector being in communication with said first end portion of said mixing tube, said middle portion defining a bore having a cross sectional area that is uniform throughout the bore and equal to the sum of the cross sectional areas of said passages; and
    a static mixing device being disposed within said bore and having a predetermined number of static mixing elements extending axially along said middle portion, said mixing tube and static mixing elements defining a tortuous mixing path.

2. An apparatus, as set forth in claim 1 portion is 29 mm².

3. An apparatus, as set forth in claim 2, wherein the length of said middle portion is in the range of about 280 to 392 mm.

4. An apparatus, as set forth in claim 3, wherein the number of static mixing elements is in the range of about 50 to 60 elements.

5. An apparatus, as set forth in claim 4, wherein said first end portion of said mixing tube includes a housing formed integrally with said mixing tube, said housing being formed by a counter bore with a reduced tapered section, and wherein said injector is disposed within said housing.

6. An apparatus, as set forth in claim 5, including a jacket having a wing assembly and being disposed about said mixing tube, said jacket connecting said injector to said mixing tube.

7. An apparatus, as set forth in claim 6, wherein said second end portion of said mixing tube includes a nozzle having tapered portion.

8. An apparatus, as set forth in claim 7, wherein said nozzle is formed integrally with said mixing tube.

9. A process for producing a homogeneous material, comprising the steps of:
   providing a plurality of reactive components at a predetermined pressure;
   passing each of said reactive components through a cylindrical passage, each of said reactive components exiting said passage with a constant flow velocity, the constant flow velocity defining a predetermined flow velocity;
   introducing said reactive components at the predetermined flow velocity to a mixing tube having static mixing elements, said mixing tube and static mixing elements defining a tortuous mixing path;
   passing said reactive components at the predetermined flow velocity through the tortupus mixing path at a predetermined mass flow rate;
   mixing said reactive components, forming a homogenous material; and
   depositing said homogeneous material to a mold in which a chemical reaction occurs.

10. A process, as set forth in claim 9, wherein said predetermined flow velocity is 100 cm/s.

11. A process, as set forth in claim 10, wherein the predetermined pressure is in the range of about 300 to about 500 p.s.i. gauge.

12. A process, as set forth in claim 11, wherein the mass flow rate of said homogenous material is 30 grams/second.

13. A process, as set forth in claim 12, wherein said reactive component are composed of polyester glycol and polymeric MDI.

* * * * *

UNITED STATES PATENT AND TRADEMARK OFFICE
CERTIFICATE OF CORRECTION

PATENT NO. : 5,225,168

DATED : July 6, 1993

INVENTOR(S) : PANKAJ KHOSLA

It is certified that error appears in the above-identified patent and that said Letters Patent is hereby corrected as shown below:

CLAIM 2, COLUMN 6, LINE 64, insert after "1", --, wherein the cross sectional area of said bore of said middle--.

Signed and Sealed this

Twenty-ninth Day of March, 1994

Attest:

BRUCE LEHMAN

Attesting Officer     Commissioner of Patents and Trademarks